United States Patent [19]

Vansnick et al.

[11] Patent Number: 5,257,922
[45] Date of Patent: Nov. 2, 1993

[54] DEVICE FOR INJECTION MOULDING PLASTIC PARTS BY THE FUSIBLE CORE TECHNIQUE

[75] Inventors: Michel Vansnick, Wemmel; Luc De Keyzer, Brussels, both of Belgium

[73] Assignee: Solvay & Cie.(Sociét é Anonyme, Brussels, Belgium

[21] Appl. No.: 848,172

[22] Filed: Mar. 10, 1992

[30] Foreign Application Priority Data

Mar. 18, 1991 [FR] France ............... 91 03370

[51] Int. Cl.$^5$ ............... B29C 45/14
[52] U.S. Cl. ............... 425/127; 264/238; 264/294; 264/317; 264/334; 425/129.1; 425/444; 425/556; 425/DIG. 12
[58] Field of Search ............... 264/238, 255, 294, 313, 264/317, 328.8, 334; 425/78, 121, 127, 129.1, 325, 444, 543, 556, 572, 588, DIG. 12

[56] References Cited

U.S. PATENT DOCUMENTS 5,085,569 2/1992 Dauphin ............... 425/174.8

FOREIGN PATENT DOCUMENTS 0356643 3/1990 European Pat. Off.
0402990 12/1990 European Pat. Off.
817270 7/1959 United Kingdom.

OTHER PUBLICATIONS

Automobiltechnische Zeitschrift, vol. 89, No. 3, 1987; pp. 139-144, Haldenwanger et al., "Kunststoff-Motorbauteile in Ausschmelztechnik am Beispiel eines Saughrohres".

Plastverarbeiter, vol. 41, No. 3, Mar. 1990, Speyer, DE, pp. 24-26, 28, "PKW-Saughrohre aus Kunststoff in Grossserie".

Caoutchoucs Et Plastiques, vol. 67, No. 698, Aug. 1990 Paris FR, pp. 51-54, De Keyzer, "Noyaux fusibles: De La Recherche A L'Industrialisation".

Primary Examiner—Tim Heitbrink
Attorney, Agent, or Firm—Spencer, Frank & Schneider

[57] ABSTRACT

A device for injection moulding plastic articles by the fusible-core technique includes a unit (1) for moulding fusible cores, a unit (2) for injection moulding, a unit (3) for melting and for recovering the fusible cores and a unit (4) for washing the moulded parts. The first two units are served by a mobile transfer robot (5) equipped with a rotatable arm having a ripper adapted to catch a fusible core and a gripper adapted to catch a moulded part. The two latter units are served by a stationary robot for melting (8) which interacts with the transfer robot (5). By programming the various functions performed by the robots, it is possible to carry out in parallel the moulding cycles of fusible cores and of injection moulding of the desired parts with a minimum of non-productive time and hence to obtain an automatic production with a high yield.

7 Claims, 1 Drawing Sheet

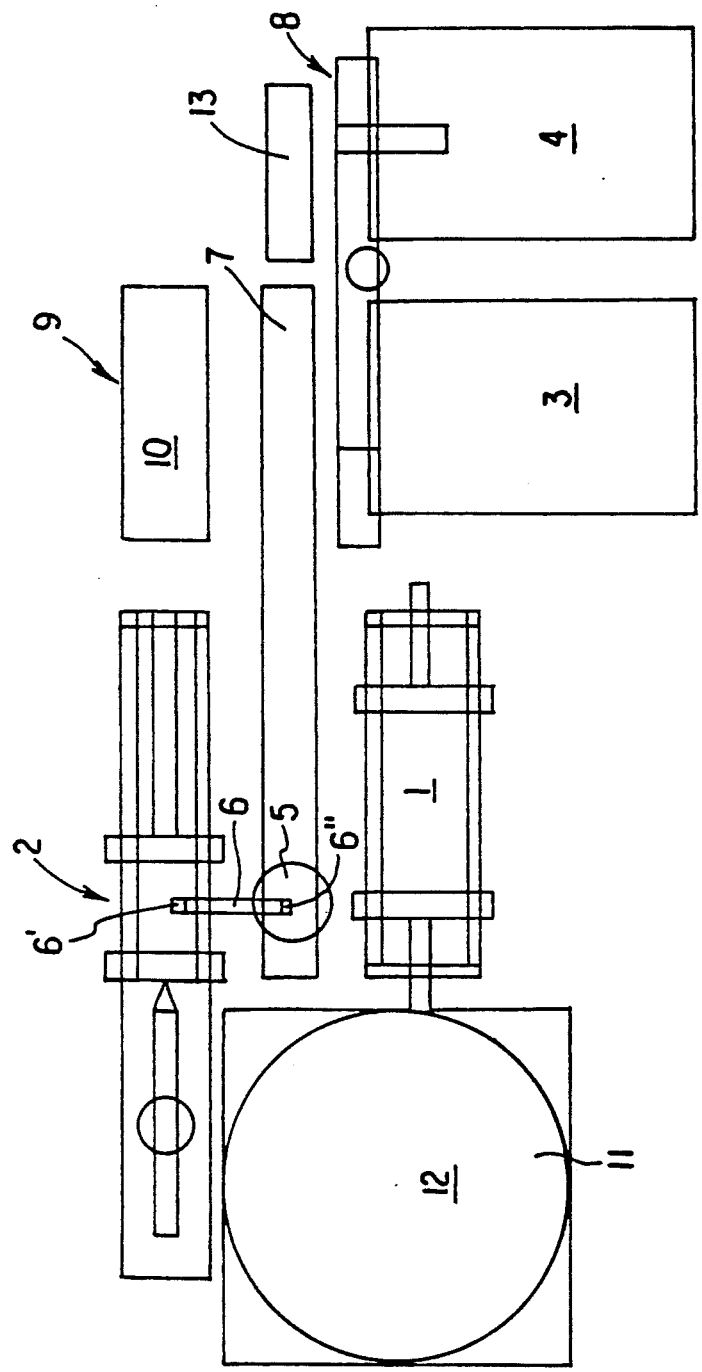

DEVICE FOR INJECTION MOULDING PLASTIC PARTS BY THE FUSIBLE CORE TECHNIQUE

BACKGROUND OF THE INVENTION

The present invention relates to a device for injection moulding plastic parts by the fusible core technique.

Nowadays it is well known to have recourse to the injection-moulding technique called fusible core technique in order to produce hollow parts of complicated profile. This technique, which is described especially in patent FR-A-1,162,096, involves at least four principal successive steps:

moulding a fusible core by low-pressure injection of a low melting-point metal into a metal mould;

injection moulding the desired part by injection of a plastic by using a conventional injection press whose mould is furnished beforehand with a fusible core;

extracting the fusible core embedded in the moulded part, by melting and recovering the metal, after extracting the part from its injection mould;

washing the moulded part stripped of the fusible core.

These successive operational steps require recourse to a series of suitable units, namely units for moulding the fusible core, for injection moulding the part, for melting and recovering the fusible core and for washing the part, and they imply, consequently, a series of transfers either of the fusible core or of the moulded part between these various units. Taking into account, furthermore, the fact that for many applications the weight of the fusible core can vary between 10 and 50 kg, it seems desirable to be able to automate all the necessary operational steps by means of a moulding cycle.

For this purpose, it is possible certainly to envisage using a robot to carry out some of these operational steps, but it turns out that such a means cannot provide all the numerous operational steps required during a moulding cycle—taking hold of and extracting the moulded part, transferring this part into the unit for melting the fusible core and then into the washing unit, taking hold of and extracting a fusible core from its moulding unit, positioning and leaving this fusible core in the injection press—whilst permitting an acceptable productivity. In particular, by proceeding in this logical order, it appears that the injection press is inactive during the cycle of successive transfers of the part moulded during the previous cycle.

SUMMARY OF THE INVENTION

The Applicant has now perfected a device for injection moulding plastic parts by the fusible core technique, the operation of which is automated, in a simple way, whilst permitting great operational flexibility and outstanding productivity.

The present invention consequently relates to a device for injection moulding plastic parts by the fusible core technique, comprising a unit for moulding fusible cores and a unit for injection moulding parts disposed in parallel together with a unit for melting and recovering the fusible cores from the moulded parts and a unit for washing the moulded parts disposed at one end of the units for moulding fusible cores and for injection moulding the parts, characterised in that it is equipped with: a) a mobile transfer robot disposed between the units for moulding fusible cores and for injection moulding the parts, the said transfer robot being equipped with a rotatable arm comprising, at one end, a gripper adapted in order to catch and to keep hold of a moulded fusible core and, at the other end, a gripper adapted in order to catch and to keep hold of a moulded part; b) a stationary robot for melting disposed between the units for moulding fusible cores and for injection moulding and in the vicinity of units for melting and recovering the fusible cores and for washing the moulded parts, the transfer robot and the robot for melting being programmed in such a way that during the execution of a moulding sequence, the transfer robot successively takes hold of and extracts the fusible core moulded in the unit for moulding fusible cores by the agency of the first adapted gripper, takes hold of and extracts a part moulded in the unit for injection moulding by the agency of the second adapted gripper, places, by a rotation of its arm, the fusible core into the unit for injection moulding and transfers the moulded part to the robot for melting which subsequently inserts the moulded part into the unit for melting and for recovering the fusible cores and then leaves this part in the washing unit.

In the device in accordance with the invention, the recourse to a transfer robot comprising a rotatable arm equipped with two adapted grippers, one for taking hold of a fusible core and the other for taking hold of a moulded part, enables, especially, a fusible core to be positioned in the injection press as soon as the latter is stripped of the part moulded in the previous cycle and, consequently, the cycles for injecting parts can continuously follow each other. Of course it is advisable to produce the rotatable arm of the transfer robot in such a way that the fusible core kept hold of by its gripper does not impede the extraction, from the unit for injection moulding, of the part moulded in the previous cycle which is extracted by the gripper provided for this purpose.

Furthermore, in this device, the time required for the injection cycle of the part can be utilised by the transfer robot in order to transfer the part moulded in the previous cycle to the robot for melting and extracting a new fusible core from the unit for moulding fusible cores.

Finally, the operational steps for melting and recovering the fusible core and for washing the moulded part are controlled by the robot for melting and can therefore be executed together with the operational steps carried out by the transfer robot.

It is consequently possible, by programming the operation of the two robots as a function of the times required for each operational step, to obtain a manufacturing cycle which is virtually free of non-productive time and therefore to achieve a very high level of productivity.

According to a particular embodiment of the device in accordance with the invention, which may prove very beneficial, the device may furthermore comprise a unit for conditioning the fusible cores, the transfer robot being programmed, in this case, in order to deposit and leave in the conditioning unit each successive fusible core extracted from the unit for moulding fusible cores and in order to take hold of, in the said unit, a conditioned fusible core and to transfer it into the unit for injection moulding.

The recourse to a device for conditioning the fusible cores, which can be simply constituted by a rotatable plate having sequenced rotation, particularly enables the time for conditioning the fusible core in the unit for moulding fusible cores to be reduced and hence may enable productivity to be increased.

It may also prove advantageous to equip the device in accordance with the invention with a unit for storing moulded parts, it being possible to program the transfer robot in such a way as to leave, in the said unit, the moulded parts successively extracted from the unit for injection moulding and, where appropriate, subsequently to take hold of these moulded parts again and to transfer them to the robot for melting.

The recourse to such a storage unit, which may be simply constituted by a table, proves particularly useful in the case of a momentary stoppage of the robot for melting or of the units for melting and for recovering the cores or for washing the moulded parts.

Finally, in order to avoid any accidental obstruction of the device, it may prove useful to equip the latter with a belt conveyor which enables it to remove and store the fusible cores and/or the moulded parts caught successively by the transfer robot in the case when one or more steps of the manufacturing cycle would be interrupted, the transfer robot, in this case, depositing and leaving these parts on the said belt conveyor which enables them to be removed to a storage location.

BRIEF DESCRIPTION OF THE DRAWING

The sole FIGURE is a diagrammatic top plan view of a preferred embodiment of the invention.

DESCRIPTION OF THE PREFERRED EMBODIMENT

As it appears in the figure, the device comprises a unit (1) for moulding fusible cores and a unit (2) for injection moulding which are disposed in parallel, a unit (3) for melting and for recovering the fusible cores and a unit (4) for washing the moulded parts, which units are disposed at one end of the units for moulding fusible cores (1) and for injection moulding (2).

The various units may be of the conventional type, the Applicant preferring however, to use, taking into account its high productivity, a unit for melting and recovering the fusible cores such as is described in patent application EP-A-0,402,990.

The device furthermore comprises a transfer robot (5) disposed between the units for moulding fusible cores (1) and for injection moulding (2) and which can be displaced parallel to these units along guide rails (7). The transfer robot (5) comprises a rotatable (6) equipped, at one end, with a gripper (61) adapted to catch and to keep hold of a fusible core and, at its other end, with a gripper (61) adapted to catch and to keep hold of a moulded part.

The device also comprises a stationary robot for melting (8) disposed between the units for moulding fusible cores (1) and for injection moulding (2) and in the vicinity of the units for melting and for recovering the fusible cores (3) and for washing the moulded parts (4). This robot (8) is equipped with a gripper (not shown) adapted to catch and keep hold of a moulded part presented by the appropriate gripper of the transfer robot (5).

The device finally comprises a unit (9) for storing moulded parts which is constituted by a table (10) and a unit (11) for conditioning (cooling) the fusible cores, constituted by a rotatable plate (12), having sequenced rotation, disposed in the vicinity of and in line with the unit (1) for moulding fusible cores.

The device as described is programmed in such a way as to automatically provide the operating sequence, hereinafter, during a production cycle of a moulded part:

a) by the agency of its appropriate gripper, the transfer robot (5) extracts a fusible core from the unit (1) for moulding fusible cores;

b) the transfer robot (5) deposits the fusible core onto the plate (12) of the conditioning unit (11) and, after one rotary step of this plate (12), catches a conditioned fusible core by means of the same gripper;

c) the transfer robot (5) is displaced towards the unit (2) for injection moulding which completes a moulding cycle and catches the moulded part, by means of the appropriate gripper, during the previous moulding cycle and extracts it from the open mould;

d) by means of a rotation of its arm, the transfer robot (5) then positions the conditioned fusible core in the mould of the unit (2) for injection moulding and leaves it there;

e) the transfer robot (5) is then displaced towards the robot for melting (8) and transfers into its gripper the moulded part extracted from the mould during the operational step c;

f) the transfer robot (5) then returns to its starting position with a view to catching and extracting the next fusible core produced in the unit (1) for moulding fusible cores and starting a new cycle again;

g) during the operational steps a), b), c) and d), the robot for melting (8), for its part, inserts the part previously moulded in the unit (3) for melting and for recovering the fusible core and then inserts and leaves this part in the unit (4) for washing moulded parts before returning to its starting position in order to receive the next moulded part transferred by the transfer robot (5).

Each robot is therefore responsible for two major operational steps of a manufacturing cycle, the transfer robot (5) serving the units for moulding fusible cores (1) and for injection moulding (2) and the robot for melting (8) serving the units for melting and for recovering the fusible cores (3) and for washing the moulded parts.

In the device as described, it is possible to program the transfer robot (5) in such a way that, in the event of an untimely stoppage of the operational steps in relation to the melting, the recovering of the fusible cores or the washing of the parts, this transfer robot (5) leaves the moulded parts on the storage table (10) instead of transferring them into the gripper of the robot for melting (8). The moulded parts stored on the storage table (10) may then be subsequently taken up again by the transfer robot (5), for example at the end of manufacturing, and be transferred in succession into the gripper of the robot for melting (8) with a view to treating them in the units for melting and for recovering the fusible cores (3) and for washing the moulded parts (4). Or, a belt conveyor 13 is provided, on which the transfer robot (5) deposits the fusible cores and/or the moulded parts in case of an operational disturbance (interruption) in the manufacturing cycle.

In the device as described, it is possible to program, in time, the successive functions normally performed by the two robots in such a way that the moulding cycles for fusible cores and for injection moulding the desired parts are carried out in parallel with a minimum of non-productive time and without disturbance.

We claim:

1. In a device for injection moulding plastic parts by a fusible core technique, including
   a first unit for moulding fusible cores;

a second unit for injection moulding parts; said second unit extending spaced from and parallel to the first unit;

a third unit for melting and recovering the fusible cores from moulded parts; and a fourth unit for washing the moulded parts; said third and fourth units being spaced from an end of the first and second units;

the improvement comprising a first, mobile transport robot disposed between said first and second units; said first robot including a rotatable arm having a first end carrying a first gripper for catching and holding a moulded fusible core; said rotatable arm having a second end carrying a second gripper for catching and holding a moulded part; and a second, stationary robot disposed within an operational range of said first robot and being situated adjacent said third and fourth units;

said first and second robots being programmable such that during performance of a moulding sequence, said first robot successively grasps and extracts a fusible core from said first unit by said first gripper, grasps and extracts a moulded part from said second unit by said second gripper and deposits, by a rotation of said arm, the fusible core into said second unit and transfers the moulded part to said second robot; and subsequently said second robot inserts the moulded part into said third unit and transfers a moulded part from said third unit to said fourth unit.

2. The device as defined in claim 1, further comprising a belt conveyor for receiving fusible cores and moulded parts from said first robot in case a step of manufacturing is interrupted.

3. The device as defined in claim 1, further comprising a fifth unit for conditioning the fusible cores; said fifth unit comprising a rotatable table for executing sequenced rotation; said first robot being programmable to deposit in said fifth unit each successive fusible core extracted from said first unit and to grasp and extract from said fifth unit a conditioned fusible core and to transfer the conditioned fusible core to said second unit.

4. The device as defined in claim 3, further comprising a sixth unit for storing moulded parts; said first robot being programmable to deposit successive moulded parts extracted from said second unit in said sixth unit and subsequently transfer the moulded parts from said sixth unit to said second robot.

5. The device as defined in claim 3, further comprising a belt conveyor for receiving fusible cores and moulded parts from said first robot in case a step of manufacturing is interrupted.

6. The device as defined in claim 1, further comprising a fifth unit for storing moulded parts; said first robot being programmable to deposit successive moulded parts extracted from said second unit in said fifth unit and subsequently transfer the moulded parts from said fifth unit to said second robot.

7. The device as defined in claim 6, further comprising a belt conveyor for receiving fusible cores and moulded parts from said first robot in case a step of manufacturing is interrupted.

* * * * *